3,441,528
METHOD OF PRODUCING ELASTIC GELS FROM THE RESIDUE OF ACID HYDROLYZED PENTOSAN-CONTAINING LIGNOCELLULOSIC MATERIAL

Joseph B. Dede, Jr., McHenry, Ill., assignor to The Quaker Oats Company, Chicago, Ill., a corporation of New Jersey
No Drawing. Filed Dec. 16, 1965, Ser. No. 514,365
Int. Cl. C09j 3/16; C08g 37/18
U.S. Cl. 260—17.2                                   11 Claims

ABSTRACT OF THE DISCLOSURE

The residue remaining after the acid hydrolysis of pentosan-containing lignocellulosic materials selected from the group corn cobs, cotton seed hulls, oat hulls, rice hulls and bagasse is admixed with water and converted to a viscose gel by vigorous agitation. This method eliminates the alkali digestion step which has been used heretofore.

---

This invention relates to a method of producing lignocellulosic elastic gels and to a method of producing phenol formaldehyde adhesives in which the lignocellulosic gel is utilized as an extender.

More particularly, this invention relates to the utilization of the solid residue of the acid hydrolysis of pentosan-containing materials, such as the residue of corn cobs, cottonseed hulls, oat hulls, rice hulls, bagasse and the like after their hydrolysis with acid, for example, as in the production of furfural. It is well known that these acid hydrolysis residues, e.g., the furfural production residues are extremely complex mixtures which contain components such as resins produced by side reactions, minerals, degradation products, etc., and some of these components haven't been completely characterized. Furfural production residues are commercially available in the United States in large quantities, and are marketed under the trademark Furafil (a trademark of the Quaker Oats Company). Such materials are simply referred to as furfural residue, hereinafter.

In the past, these acid hydrolysis residues have been dried and dry-ground, and these materials have been extensively employed as fillers and/or extenders in the manufacture of phenol formaldehyde adhesives, particularly for use in the fabrication of plywood. However, the methods previously employed for the production of adhesives usually involved the digestion in a glue mixer of the granular or finely pulverized residue in a highly alkaline solution for a period of time sufficient to develop the desired viscosity and other properties.

It is one of the objects of this invention to provide a method of producing lignocellulosic elastic gels from the acid hydrolysis residues, such as the furfural residues, which method does not require the use of alkalies. It is a further object of this invention to provide a method of producing such gels and adhesives, which method does not require the use of dry-operating fine-grinding mills. It is an additional object of this invention to provide a continuous method for producing gels and adhesives from such residues, by which method the viscosity of the product can be continuously monitored and in which simple adjustment in operating conditions provides immediate adjustment of the physical properties of the product as required. It is a further object to provide a method by which a lignocellulosic gel can be formed under either acidic, neutral or alkaline conditions.

These and other objects which will be apparent hereinafter are accomplished by the method comprising the steps of admixing water and residue remaining after the acid hydrolysis of pentosan-containing vegetative materials, the water content of said residue having been maintained preferably above about 5%, more preferably above about 9%, and even more preferably above about 15% prior to said admixing, and subjecting the resulting admixture to vigorous agitation for a period of time sufficient to develop the desired viscosity.

In a preferred embodiment for producing a gel, the acidic untreated residue from a furfural production run is admixed with water, for example, in an amount sufficient to provide a 2:1 weight ratio of water to residue. The resulting admixture is vigorously agitated, for example, with high-speed mixing equipment, high-speed blenders, an attrition type mill such as a disc mill or other equivalent conventional equipment which will provide vigorous agitation.

The rate at which the viscosity increases during the agitation step in this invention depends in part on the vigor of the agitation, although as illustrated hereinafter, other variables, such as solids content, viscosity of the system, and particularly the history of treatment of the residue are also found to affect this rate. Comparatively gentle agitation, such as that achieved with ordinary mixing devices, can usually provide viscosities in accordance with this invention over 10,000 cps. only after a period of time considerably in excess of an hour. More vigorous mixing conditions, such as those provided by a Waring Blendor, can provide viscosities in excess of 10,000 cps. in less than 10 minutes in accordance with this invention at surprisingly low solids levels. Extremely vigorous agitation, such as that encountered in a disc mill, can provide such viscosities almost instantaneously in accordance with this invention in similar systems. The viscosity of the resulting elastic gel will depend somewhat on the amount of residue solids employed, on the amount and vigor of agitation to which the resulting slurry has been subjected, and on other variables as discussed herein.

The resulting elastic gel is usful as a drilling mud. It is particularly useful as an extender for phenol formaldehyde resins in plywood adhesives. Suitable adhesive resins may be dispersed in a pre-formed gel produced in accordance with this invention to provide a highly effective plywood adhesive.

In a preferred embodiment for producing an adhesive, the water-soluble polymerizable adhesive resin is processed with the residue-water ingredients in the method of this invention. For example, untreated furfural residue is admixed with water in an amount sufficient to provide a 2:1 water-solids ratio and with sufficient phenol formaldehyde resin to provide a 5:1 ratio of resin to residue solids. The resulting admixture is subjected to vigorous agitation for a period of time sufficient to develop the desired viscosity. In this embodiment, the agitation conditions encountered in a Waring Blendor provides suitable viscosities, e.g., 5,000 to over 10,000 cps. at 21° C. in less than 10 minutes and as the agitation continues, the viscosity increases. If a more vigorous machine, such as a disc mill, is employed to provide the vigorous agitation, the desired viscosities are achieved almost instantly. The viscosity of the product may be altered by varying the time of agitation in a mixing device, such as a Waring Blendor, whereas the viscosity is also controlled or adjusted when using devices such as a disc mill, by simply adjusting the spacing between the rotating discs.

I have discovered that the vigorous agitation step of this invention can be used instead of the caustic treatment step of the prior art, for the purpose of developing or increasing the viscosity of the water-containing system. Use of dry-ground residue gives results equivalent to those obtained by caustic treatment of the dry-ground residues. However, I have discovered that a totally unexpected increase in efficiency is achieved if unground residues or undried residue is employed in the process of this invention.

Another of the totally unexpected features of this invention is that the vigorous agitation step leads to an increase in viscosity, regardless of the pH of the system. Untreated commercially available furfural residues often provide a pH between about 1.5 and 3.0 when dispersed 50:50 in water, and as disclosed herein, subjecting these slurries to vigorous agitation will bring about a totally unexpected increase in viscosity. Example 1 illustrates such a method in which the time during which any particular portion of the water-residue mixture was subjected to vigorous agitation amounted to but a fraction of a second. Also, a neutralization of the residue acidity with sufficient base to provide substantially neutral or alkaline pH conditions is also entirely permissible in accordance with the practice of this invention. Since conventional phenol formaldehyde resins often contain a sufficient amount of base to catalyze the polymerization of the resin solids, the adhesives produced therefrom in accordance with this invention almost invariably have an alkaline pH. Example 6 below illustrates such a method in which the time during which any particular portion of the water-residue-resin mixture was subjected to vigorous agitation amounted to but a few seconds, at the most.

It is clear from the above general description and the following more detailed examples that this invention provides a convenient, easily controllable method for producing lignocellulosic gels and for producing adhesives utilizing these gels. This method does not require use of dry grinding, or caustic treatment of the pulverized dry-ground residue materials. While I do not want to be bound by a theory, it is my belief, based on the observation of much experimental data, that the prior art methods involving drying and dry-grinding of the lignocellulosic residues have an adverse effect on the residue in regard to its value in providing a viscous gel when admixed with water. The heating of the residue during drying and dry-grinding appears to have a particularly adverse effect. The data presented below in Example 4, for example, indicates that drying of the residue decreases its efficacy and that dry-grinding results in a dramatic drop in the value of the residue in regard to development of a viscous gel when used in accordance with this invention. On the basis of the experimental evidence, it appears that while the dry-grinding does reduce the larger particles, the severe impact conditions adversely affect the extremely fine residue particles. It is my opinion that the caustic treatment of the prior art was made necessary, therefore, by the prior art grinding step which I have discovered abuses rather than improves the residue for use in aqueous systems. Nonetheless, I have discovered that while dry-ground residue is the least desirable material for use in the method of this invention, the vigorous agitation step of this invention can be utilized to replace the caustic treatment step in order to develop the increase in viscosity when dry-ground residue is used.

The phenol-formaldehyde resins used in this invention include polymerizable water-soluble phenol-formaldehyde resins generally and includes the conventional resins of this type currently used in plywood adhesives. Examples of commercially available resins which are useful in the practice of this invention include PF520 and PF535 (trademark of Monsanto Chemical Co.), P398 (trademark of Reichhold Chemicals, Inc.), Cascophen W156 (trademark of Borden Co.) and Weldwood P–40 (trademark of Balfour Guthrie Co., Ltd.). Obviously solid, water-insoluble phenol-formaldehyde resins, such as "C Stage" phenol-formaldehyde resins, are not contemplated, and if used by themselves would be inoperative. Examples of methods by which suitable phenol-formaldehyde resins may be produced are described in patents such as Re. 23,347; 2,360,376; 2,437,981; and 2,457,493 and the like.

The following examples are intended to illustrate further the practice of this invention and not to limit the scope of the invention. Viscosity determinations providing the data reported herein were made on a Brabender Recording Viscosimeter with a heavy spring and 8-bladed, star-shaped paddle. The readings observed after 30 seconds of stirring were used in calculation of viscosity. The viscometer readings were multiplied by 10 to give centipoise viscosity. This conversion was verified by calibration using standard silicone oil. All determinations were made at 21° C. The viscosity so reported is sometimes also referred to as "stirred viscosity." In the following examples, quantities are in parts by weight, unless otherwise indicated.

Example 1

The acid hydrolysis residue used in this example was obtained in conjunction with conventional commercial furfural production. Ten parts of water and 5 parts of unground furfural residue containing approximately 40% moisture were premixed and formed a thin slurry. The residue was acidic and had been maintained at the 40% moisture level since its removal from the furfural reactor. The slurry was passed through an 8 inch single-disc Bauer attrition mill operating at 3,600 r.p.m. with a 3 horsepower motor. The material resulting from this treatment was a highly viscous thixotropic elastic gel which would barely fall out of the mill housing. The period of time during which any one portion was subjected to the action of the rotating disc is believed to be in the order of a fraction of a second. The thin slurry was fed through the disc at the rate of about fifteen pounds a minute. For comparison, a mixture of dry-ground furfural residue and water having the same 2:1 water to residue ratio was prepared. The dry-ground residue was a finely pulverized dry powder which had been dry-ground so that 100% would pass through a standard 325 mesh screen. This mixture was stirred to form a uniform suspension. The resulting suspension showed very little increase in viscosity over that of water.

Example 2

This example illustrates the use of this invention in the manufacture of a plywood adhesive. One thousand nine hundred ninety five (1,995) parts of room temperature water were admixed with 1,465 parts of unground furfural residue containing approximately 42% moisture. This residue had been maintained at moisture levels at least this high, since its removal from the furfural reactor. Four thousand five hundred forty (4,540) parts of a phenol-formaldehyde adhesive resin (P398 Plyophen) which contained 40% resin solids was added to the resulting thin aqueous admixture. The resulting thin resin-water-residue mixture was passed through an 8 inch single-disc Bauer attrition mill operated at 3,600 r.p.m. with the space between discs being approximately .004 inch. The stirred viscosity of the resulting thixotropic elastic gel adhesive was about 5,500 cps. at 21° C. after a single pass through the mill. For comparison a dry-ground sample of furfural residue was digested with alkali in accordance with the following procedure: Water (420 parts) was admixed with Norprofil, a 100 mesh furfural residue containing only 5% water (200 parts), a premixed caustic solution made up of half caustic flake and half water (40 parts) and stirring of the resulting admixture was continued for two additional minutes. Soda ash (40 parts) was thereupon added and the mixing continued an additional 20 minutes. External cooling was then applied to the mixture and P398 Plyophen phenol formaldehyde resin (1,000 parts) was thereupon added and mixing continued for an additional 5 minutes. The viscosity of the product prepared by this alkali digestion method (not in accordance with this invention) from dry ground residue was only 1,150 cps. at 21° C., even though the residue solids content was identical to that used to prepare the 5,500 cps. viscosity adhesive in accordance with this invention as described in Example 2 above.

Example 3

The purpose of this example is to illustrate the use of the adhesive prepared in accordance with this invention and to compare the results obtained with those obtained from the use of a prior art alkali digestion adhesive. A thin coating of the two adhesives produced in Example 2 was applied uniformly to two series of plywood panels of Douglas Fir plywood 12″ x 12″ x ¼″. Glue spread was 60 lbs. per 1,000 sq. ft. double glue line. Some of the panels of each series were assembled with face plies crossed. Assembly times of 20 and 30 minutes were allowed. They were pressed 7 minutes at 300° F. and 175 p.s.i., and then hot stacked. After cooling they were tested. Upon attempting to pry apart the glued panels, it was found that the degree of wood failure encountered in the knife test on panels joined with the glue made in accordance with this invention was the same order of magnitude as the wood failure encountered in panels joined by the prior art alkali digestion adhesive, both panels evidencing excellent adhesive characteristics. Other panels to which the thin coating of the adhesives prepared in Example 2 were applied, were left open for an open-face penetration test. It was observed that after forty-five minutes the glue prepared in accordance with this invention remained on the surface of the plywood panel to the extent that none of the grain of the panel was visible through the adhesive coating and in fact brush marks which were formed during the application of the adhesive remained visible. On the other panel, the wood grain was clearly visible on the coated surfaces and the major part of the adhesive appeared to have left the glue line and penetrated into the wood. It is emphasized that the adhesive produced in accordance with this invention utilized exactly the same residue solids level as the prior art adhesive prepared for comparison purposes. It is further noted that in spite of the identical solids level utilized in the preparation of both of these adhesives, the adhesive produced in accordance with this invention had approximately 4 times the viscosity as that encountered in the prior art adhesive. Consequently, it is apparent that the preparation of adhesives in accordance with this invention requires far less solids content for the development of comparable physical properties such as viscosity. This feature of this invention is further illustrated in Example 5.

Example 4

The purpose of the following tests is to illustrate further the adverse effect of drying, and dry-grinding on the quality of the furfural residue with respect to its usefulness as a viscosity developer in an aqueous system when used in accordance with this invention. In this test 5 batches of glue were prepared, and numbered 1 through 5. The quantities of residue and water were adjusted to provide approximately 47.5 parts of residue solids (dry basis) and 107.5 parts of water exclusive of the water added as part of the adhesive resin. The resin (250 parts) employed in each of the batches was the same resin utilized in Example 2 above. In tests numbered 1 through 3 a Waring Blendor was employed to provide the vigorous agitation. In tests numbered 4 and 5 a Kitchen Aid Mixer was employed to provide a less vigorous degree of agitation. In Test 1, a commercially available dry-ground (100% through 100 mesh) furfural residue, known as Norprofil, was employed. In Test 2 a dry-unground residue having a 5% moisture was employed, while Tests 3 through 5 utilized unground residue which had been maintained at about 40% moisture from the time of its removal from the furfural reactor. In Test 4 the liquid adhesive resin was added incrementally to the furfural residue during the period of agitation. In Test 4 about one-fifth of the resin was added initially and this resulted in a rather pasty mass which was stirred for one-half hour during which there was some increase in viscosity before the addition of more resin. Additional resin was added at that time so that approximately one-half of the total resin was then included. As mixing continued, the viscosity markedly increased. After about one hour and fifteen minutes the rest of the resin and the entire amount of the water was added slowly over a period of several minutes so that the resulting pasty mass became thoroughly mixed with the added liquids. The mixing was thereafter continued for another 10 minutes so that the entire period of mixing in Test 4 amounted to approximately 1½ hours. In Test 5 all ingredients were admixed initially as they were in Tests 1 through 3. In each of the tests numbered 1, 2, 3 and 5 the initial suspension exhibited a viscosity reading of approximately one. The initial admixture in Test 4, however, was a thick paste, as indicated above. Although Test 5 utilized a mixing device identical to that used in Test 4, the viscosity increased at an almost imperceptible rate during the first hour in Test 5. This is believed to be due to the lower viscosity of the system in Test 5. The data and results of the tests are summarized in Table 1 below.

TABLE 1

| Test No. | Binder solids | Binder moisture, percent | Agitation time | Agitating device | Gel viscosity (21° C.) | +100 mesh in gel, percent |
|---|---|---|---|---|---|---|
| 1 | Norprofil (−100 mesh) | 5 | 10 min | Waring Blendor | 1,050 | .02 |
| 2 | Unground residue | 5 | 10 min | do | 4,800 | .31 |
| 3 | do | 40 | 10 min | do | >10,000 | .34 |
| 4 | do | 40 | 1½ hr.[1] | Kitchen Aid Mixer | >10,000 | 5 |
| 5 | do | 40 | a. 2½ hr | do | 1,400 | 5 |
|   |   |   | b. 4 hr | do | 4,500 |   |

[1] Liquids added incrementally to residue-containing mixture during agitation period.

From an examination of Table 1 and a comparison of Tests 1, 2 and 3, it is clear that drying of the residue has an adverse effect on the rate of development of viscosity when used in accordance with this invention, and, moreover, that the dry grinding of residue has a most serious adverse effect on the rate of viscosity development. In Test 4 in which the water was added incrementally the higher initial viscosity of the suspension due to the increased solids level in the aqueous suspension apparently transmitted the effect of the agitation through the aqueous suspension more efficiently so that the viscosity developed far more rapidly in Test 4 than in Test 5. By the same token, I believe the effect of the agitation in Test 5 was less efficiently transferred to the entire mass due to the increased fluidity of the initial suspension. It is noted that no significant increase in viscosity occurred throughout the first hour of comparatively gentle agitation in Test 5 though after about 2½ hours and 4 hours the viscosity had developed to 1,400 cps. and 4,500 cps. respectively.

Example 5

In Test 1 of Example 4 it was seen that an adhesive gel produced by vigorous agitation of a dry-ground furfural residue exhibited a viscosity of 1,050 cps. at 21° C. To illustrate further the effective use and advantages of this invention, additional test batches numbered 6, 7 and 8 were prepared using undried unground furfural residue (40% moisture). In preparing these batches the solids level was decreased incrementally and the water content increased accordingly so that the resin content of the resulting adhesives remained constant. Hence, the amount of water increase equalled the amount by which the solids was decreased so as to keep the total weight of the formula constant. Otherwise, the resin-residue-water suspension was prepared as in Tests 1 through 3 of Example 4 and the resulting suspension vigorously agitated in a Waring Blendor for 10 minutes. The pertinent data appears in Table 2.

TABLE 2

| Test No. | Wt. of residue (40.5% H₂O) | Wt. residue solids (dry basis) | Weight H₂O | Weight resin | Viscosity |
|---|---|---|---|---|---|
| 6 | 50 | (29.5) | 105 | 250 | 2500 |
| 7 | 42.5 | (25.2) | 112 | 250 | 900 |
| 8 | 40 | (23.8) | 115 | 250 | 600 |

Hence, on the basis of the data of Table 2, it is estimated that by employment of the invention disclosed herein, undried, unground furfural residue solids were required at a level of only 53% of the level of the dry-ground furfural residue to provide the same viscosity when residues are used in a procedure otherwise in accordance with this invention. Nonetheless, it is noted that the viscosity and other properties of the adhesive produced in accordance with Test 1 of Example 4 provide a usable adhesive composition without the necessity of caustic digestion as heretofore believed necessary.

Example 6

As indicated above, a disc mill is a preferred device for continuously subjecting the suspension to vigorous agitation. The following example illustrates the use of a Bauer 8 inch single disk attrition mill operating at 3,600 r.p.m. with a 3 horsepower motor. The particular mill in which the following tests were performed was designed so that the gap between the grinding plates was adjustable while the mill was in operation. The runs were made in the order shown in Table 3. The numbers under "time of thruput" in Table 3 refer to the number of seconds required for 16 pounds of aqueous suspension to pass through the mill. Each run utilized an aqueous suspension which was prepared from 400 parts of water, 200 parts of unground, undried furfural residue and 1,000 parts of P398 Plyophen brand of phenol-formaldehyde resin which in turn contained 40% resin solids and 60% water. The numbers included in the "viscosity" column represent the viscosity observed while the gel was being stirred at 21° C. The results are summarized in Table 3 below.

TABLE 3

| Disc gap (inch) | Time of thruput (16 pounds), (sec.) | Viscosity (cps.) | Percent on 100 mesh |
|---|---|---|---|
| .006 | 154 | 5,300 | 1.1 |
| .010 | 53 | 950 | 2.9 |
| .008 | 81 | 1,550 | 1.4 |
| .006 | 103 | 2,800 | 1.3 |

In the practical operation of this invention in such a disc mill, i.e., one which permits adjustment of gap spacing while the mill is in operation, the operator can adjust the gap setting while the mill is producing product, decreasing the gap to increase the viscosity and increasing the gap to decrease the viscosity, so that within a few minutes from the start of the run the product viscosity can be adjusted to the desired level. Viscosity can be held at a desired level throughout the run, by further adjustments in the same manner to compensate for variations in resin batches, residue batches, ingredient make-up and the like.

It is noted that the rate and extent of viscosity development depends also on the level of solids utilized in the initial suspension as illustrated in Example 4, and this provides a further alternative to the operator for the purpose of making adjustments in the viscosity of the gel or adhesive.

Example 7

To illustrate further the development of viscosity as the vigorous agitation continues, a series of eight tests, numbered 9 through 16, were performed on the same formula adhesive. Each test was performed on a suspension of 50 parts of 40% moisture, unground residue, 105 parts of water and 250 parts of adhesive resin (P398). The test batches were each subjected to the vigorous agitation in a Waring Blendor for a different period of time as indicated in Table 4. The results are tabulated in that table.

TABLE 4

| Test No. | Time (min.) | Viscosity at 21° C. |
|---|---|---|
| 9 | 2 | 200 |
| 10 | 4 | 600 |
| 11 | 6 | 1,100 |
| 12 | 8 | 1,500 |
| 13 | 10 | 2,100 |
| 14 | 14 | 2,900 |
| 15 | 18 | 4,150 |
| 16 | 26 | 5,350 |

Hence, the viscosity increases as the agitation continues. It is considered obvious that there must be an upper limit, however. The elastic character of the gels produced in accordance with this invention may be observed, for example, by gently rotating the container of a low viscosity gel through a small horizontal arc and observing (from above) the "snap back" or reverse in direction of rotation of the center of the gel when rotation of the container ceases. The elastic character of a more viscous gel, e.g., above 10,000, may be observed by standing a pencil in the gel, gently deflecting the extended tip a short distance, e.g., a quarter inch, and observing the pencil's "snap-back" or return to its approximate original position.

Example 8

To illustrate further the detrimental effect of dry-grinding of the acid hydrolysis residue, two additional tests, numbered 17 and 18, were performed. Both tests utilized a furfural residue which had been dried to about 10% moisture, and a formula of 50 parts residue, 105 parts water and 250 parts resin (Reichhold P398). For Test 17, the residue was dry-ground in a micro-sample mill to 100% through 100 mesh. Test 18 utilized the same residue, unground. The ingredients were admixed in each case, and each admixture subjected to vigorous agitation for 10 minutes in a Waring Blendor. The results are summarized in Table 5 below.

TABLE 5

| Test No. | Condition of residue | Viscosity of adhesive |
|---|---|---|
| 17 | Ground (100%-100 mesh) | 1,900 |
| 18 | Unground | 6,200 |

Example 9

The purpose of this example is to illustrate further the use of this invention in preparing plywood glues and to show that water content may be increased without sacrificing glue viscosity, or substantially impairing glue efficiency. This in turn illustrates that an increased glue line area can be obtained from a given amount of resin.

Two glue batches were prepared in accordance with this invention, Test No. 19 being a "control" which uses the percent resin solids recommended by the manufacturer of the resin, and Test No. 20 using an identical formulation except that the weight of the batch is increased by about 10% by adding extra water. The Test No. 19 ingredients were admixed and subjected to 5 minutes vigorous agitation in a 1-gallon institutional-type Waring Blendor. Test No. 20 ingredient admixture was subjected to 10 minutes vigorous agitation in the same equipment.

Panels were prepared as follows: Douglas fir core stock (3/16" x 12" x 12") and face sheets (1/8" x 12" x 12") were conditioned to 3–5% moisture. Glue was spread at the rate of 60 lbs. glue per 1,000 sq. ft. of double glue line and five ply panels were assembled and allowed 40 minutes of open assembly time. They were pressed 7 minutes at 200 p.s.i. pressure with platen temperature being 300° F. After hot stacking, the panels were subjected to tests in accordance with Commercial Standard CS–45–55. The data and results are summarized in Table 6 below.

TABLE 6

| | Test 19, control | Test 20, water extended |
|---|---|---|
| Glue formula: | | |
| Furafil (42% $H_2O$) | 328 | 328 |
| Water | 412 | 576 |
| Resin (Plyophen P398) | 1,000 | 1,000 |
| Vigorous agitation time (min.) | 5 | 10 |
| Glue viscosity (cps.) | 4,400 | 5,800 |
| Panel strength (p.s.i.) | 175 | 173 |
| Percent wood failure | 99 | 100 |

In its broadest aspect, this invention involves the development of an aqueous viscous elastic lignocellulosic gel produced from the acid hydrolysis residue of pentosan-containing lignocellulosic materials by the simple expedient of subjecting an aqueous admixture containing the residue to vigorous agitation. As disclosed herein, the use of this invention permits more efficient use of furfural residue insofar as a lower level of residue can be used to provide the equivalent viscosity. Moreover, as a result of this invention, the necessity of the use of caustic treatment for the purpose of developing viscosity of the aqueous admixtures of the residue and the necessity of caustic digestion in glue mixers has been eliminated. Since the viscosity can be conveniently and continuously adjusted in the practice of this invention utilizing equipment such as a disc mill, variations in the make-up of the process stream resulting from variations in resin batches or furfural residue batches or ingredient make-up operating errors can be compensated for as a result of this invention. Insofar as the "residence time" of the processed mixtures in the mill is in the order of seconds, these adjustments permit correction of product properties before large amounts of off-standard adhesive are prepared. Hence, this invention provides a most desirable high-speed continuous method for manufacture of adhesives and gels. Moreover, this invention is also particularly suited to the production of large or small quantities of adhesives or elastic gels in batch operations.

It is noted that the furfural residue may contain appreciable quantities of relatively firm shot sized agglomerates which will not be broken up by the less vigorous degrees of agitation. Hence, if it is necessary that the gel or adhesive pass through a specified fine sieve, the operator can continue the agitation until the required degree of viscosity is achieved and then simply pass the adhesive through an appropriate sized screen or sieve to provide an adhesive which is 100% through the specified sieve. The quantity of these relatively firm shot sized agglomerates may amount to approximately 5–7% of the furfural residue solids as measured by 100 mesh wet screen test, for example, and if the less vigorous agitation conditions are utilized, the resulting gel or adhesive would probably contain this amount or a smaller amount of these aggregates prior to sieving. If a more vigorous agitation, such as that encountered with a Waring Blendor or disc mill, is utilized, most of these agglomerates are broken up. This is further illustrated by comparison of screen size of the product of Tests 2 and 3 with Tests 4 and 5 of Example 4.

In the production of gels in accordance with this invention, residue solids are employed in an amount between 5 and 40%, preferably in an amount between 20% and 33%, based on the weight of the resulting gel. In accordance with this invention, plywood adhesives may be prepared by mixing with these gels, or the ingredients used to prepare the gels, the conventional phenol formaldehyde resins described above in an amount between 75% and 25%, and preferably in an amount between 71.5% and 33%, based on the weight of the resulting adhesives.

Descriptions of what might be considered conventional acid-catalyzed furfural production methods involving acid hydrolysis of lignocellulosic pentosan-containing materials are to be found among the many furfural production patents, such as, for example, U.S. Patents 1,735,084; 1,919,877; 1,919,878; 1,960,812; 2,140,572; 2,362,390; 2,689,250; 2,884,428; 3,115,504 and the like. It is to be understood that in accordance with this invention, it is not necessary to separate components from the acid hydrolysis residue of the pentosan-containing lignocellulosic materials which is produced, for example, in such acid-catalyzed furfural production methods.

While drying and pH adjustment are permissible, it is preferred that the above-defined residue be subjected to no purification or separation of components for use in accordance with this invention.

I claim:
1. A method of producing a viscous lignocellulosic elastic gel having a viscosity in excess of 5,000 cps. at 21° C., consisting essentially of the steps admixing water with residue remaining after the acid hydrolysis of pentosan-containing lignocellulosic materials selected from the group corn cobs, cottonseed hulls, oat hulls, rice hulls, and bagasse, and subjecting the resulting mixture to vigorous agitation for a period of time sufficient to develop the desired viscosity in excess of 5,000 cps., the moisture level of said residue having been maintained in excess of 5% prior to said admixing.

2. A method of producing a plywood adhesive having a viscosity in excess of 5,000 cps. at 21° consisting essentially of the steps admixing polymerizable, water-soluble phenol-formaldehyde resin, water and residue remaining after the acid hydrolysis of pentosan-containing lignocellulosic vegetative material selected from the group corn cobs, cottonseed hulls, oat hulls, rice hulls, and bagasse, and subjecting the resulting mixture to vigorous agitation for a period of time sufficient to develop the desired viscosity in excess of 5,000 cps., the moisture level of said residue having been maintained in excess of 5% prior to said admixing.

3. A method as in claim 1 in which said residue is unground furfural residue.

4. A method as in claim 1 in which said residue is unground furfural residue, the moisture content of which was maintained above about 15% prior to said admixing.

5. A method as in claim 3 in which the vigorous agitation is supplied by means of a disc type attrition mill.

6. A method as in claim 2 in which said residue is unground furfural residue.

7. A method as in claim 2 in which said residue is unground furfural residue, the moisture content of which was maintained above about 15% prior to said admixing.

8. A method as in claim 2 in which the vigorous agitation is supplied by means of a disc type attrition mill.

9. A high-speed continuous method of manufacture of phenol-formaldehyde adhesives characterized by its capability of continuous adjustment of viscosity of the adhesive product consisting essentially of the steps: (1) admixing a water-soluble polymerizable phenol-formaldehyde resin, water, and residue remaining after the acid hydrolysis of pentosan-containing lignocellulosic material selected from the group corn cobs, cottonseed hulls, oat hulls, rice hulls, and bagasse, the moisture level of said residue having been maintained in excess of 5% prior to said admixing, and (2) subjecting the resulting admixture to vigorous agitation by means of an attrition type mill.

10. A method as in claim 9 in which said residue is unground furfural residue.

11. A method as in claim 9 in which said residue is unground furfural residue, the moisture content of which was maintained above about 15% prior to said admixing.

References Cited

UNITED STATES PATENTS

| | | | |
|---|---|---|---|
| 2,727,869 | 12/1955 | Ash et al. | 260—17.2 |
| 3,231,526 | 1/1966 | Wilson | 260—17.2 |

WILLIAM H. SHORT, *Primary Examiner.*

E. M. WOODBERRY, *Assistant Examiner.*

U.S. Cl. X.R.

106—123; 252—8.5